United States Patent [19]

Holliger

[11] Patent Number: 5,008,379
[45] Date of Patent: Apr. 16, 1991

[54] CHROMIUM COMPLEXES OF SULFO GROUP CONTAINING DISAZO COMPOUNDS HAVING A RESORCINOL BISCOUPLING COMPONENT RADICAL

[75] Inventor: Herbert Holliger, Allschwil, Switzerland

[73] Assignee: Sandoz Ltd., Basel, Switzerland

[21] Appl. No.: 114,901

[22] Filed: Oct. 29, 1987

Related U.S. Application Data

[63] Continuation of Ser. No. 715,701, Mar. 25, 1985, abandoned, which is a continuation of Ser. No. 188,687, Sep. 19, 1980, abandoned.

[30] Foreign Application Priority Data

Sep. 25, 1979 [CH] Switzerland ............ 8638/79

[51] Int. Cl.$^5$ ............ C09B 45/28; C09B 33/04; D06P 1/10; D06P 3/00
[52] U.S. Cl. ............ 534/684; 534/688; 534/583; 534/602; 534/693; 534/728; 534/582
[58] Field of Search ............ 534/684

[56] References Cited

U.S. PATENT DOCUMENTS

| | | | |
|---|---|---|---|
| 2,111,559 | 3/1938 | Fellmer | 534/684 X |
| 2,136,650 | 11/1938 | Crossley et al. | 534/684 X |
| 2,216,164 | 9/1941 | Fellmer | 534/684 X |
| 2,950,274 | 8/1960 | Kracker et al. | 534/684 X |
| 3,134,760 | 5/1964 | Schweizer et al. | 534/684 X |
| 3,185,676 | 5/1965 | Klein | 534/684 X |
| 3,975,369 | 8/1976 | Wicki | 534/684 |
| 4,424,152 | 1/1984 | Mennicke et al. | 534/684 |

FOREIGN PATENT DOCUMENTS

| | | | |
|---|---|---|---|
| 595187 | 4/1934 | Fed. Rep. of Germany | 534/684 |
| 670935 | 1/1939 | Fed. Rep. of Germany | 534/684 |
| 707225 | 6/1941 | Fed. Rep. of Germany | 534/684 |
| 1344372 | 1/1974 | United Kingdom | 534/684 |
| 1503707 | 3/1978 | United Kingdom | 534/684 |

*Primary Examiner*—Floyd D. Higel
*Attorney, Agent, or Firm*—Gerald D. Sharkin; Richard E. Vila; Melvyn M. Kassenoff

[57] ABSTRACT

Water-soluble, anionic, chromium complexes of disazo compounds, at least one of the complex-forming disazo compounds being of the formula,

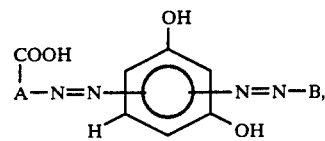

in which

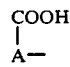

is the radical of a carboxy group-containing diazo component of the benzene or naphthalene series, the carboxy group being ortho to the azo group and the diazo component being free from other metallizable groups, and B— is the radical of a diazo component of the benzene or naphthalene series free from metallizable substituents, which complexes contain at least one water-solubilizing group, are in free acid or salt form and are useful for dyeing and printing substrates such as natural and synthetic polyamides, polyurethanes and anodized aluminum, particularly fur-lined leather.

6 Claims, No Drawings

CHROMIUM COMPLEXES OF SULFO GROUP CONTAINING DISAZO COMPOUNDS HAVING A RESORCINOL BISCOUPLING COMPONENT RADICAL

This application is a continuation of application Ser. No. 06/715,701, filed Mar.25, 1985 and now abandoned, which is a continuation of application Ser. No. 06/188,687, filed Sept. 19, 1980 and now abandoned.

The present invention relates to anionic water-soluble chromium complexes of disazo compounds, their production and use as anionic dyestuffs.

More particularly the present invention provides water-soluble, anionic dyestuff-chromium complexes of disazo compounds, at least one of the complex-forming disazo compounds being of formula I,

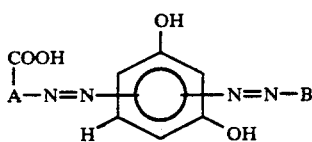

in which

is the radical of a carboxy group-containing diazo component of the benzene or naphthalene series, the carboxy group being ortho to the azo group and the diazo component being free from other metallizable groups, B is the radical of a diazo component of the benzene or naphthalene series and is free from metallizable substituents, which complexes contain at least one water-solubilising group and are in free acid or salt form.

The divalent radical —A— of the benzene or naphthalene series is optionally substituted by substituents common for such diazo components in anionic metal-complex dyestuffs; however, as stated above, further metallisable groups, such as hydroxy and amino groups ortho to the azo group and hydroxy groups ortho to the carboxy group, are excluded. Furthermore, the radical —A— is free from fibre-reactive groups and is preferably free from hydroxy or amino groups in any position. When —A— is the radical of naphthalene series it is naphthylene-1,2 or —2,3 which is further unsubstituted. When —A— is a radical of the benzene series it is preferably ortho-phenylene optionally substituted by up to two substituents selected from the group consisting of alkyl, alkoxy, halogen, nitro, carboxy and sulpho.

The alkyl and alkoxy groups in A preferably contain 1 to 4 carbon atoms and can be linear or branched. Preferred alkyl and alkoxy groups are those which contain 1 or 2 carbon atoms, with methyl and methoxy being most preferred. Any halogen in A is preferably chlorine.

Preferred radicals —A—COOH are 2-carboxynaphthyl-1,2-carboxynaphtyl-3 and radicals of formula (a₁)

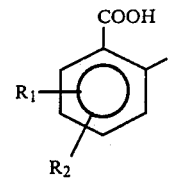

in which $R_1$ is hydrogen, chlorine, $C_{1-4}$alkyl, carboxy or sulpho, and $R_2$ is hydrogen, $C_{1-4}$alkyl or nitro.

Preferably $R_1$ is $R_1'$, where $R_1'$ is hydrogen, chlorine, methyl, carboxy or sulpho. $R_2$ is preferably $R_2'$, where $R_2'$ is hydrogen, methyl or nitro, more preferably hydrogen or nitro.

More preferably —A—COOH is a radical (a₁), with radicals of formula (a₁') being even more preferred,

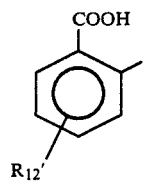

in which $R_{12}'$ is hydrogen, methyl, sulpho, nitro or carboxy, preferably hydrogen, sulpho or carboxy.

Preferred radicals (a₁') are those in which $R_{12}'$ is hydrogen or sulpho, especially hydrogen.

The radical B is optionally substituted by substituents common for such diazo components in anionic metal-complex dyestuffs, but is free from metallizable groups such as hydroxy, amino or carboxy groups ortho to the azo group and hydroxy and carboxy groups ortho to each other. Further, such diazo components are free from fibre-reactive groups and are preferably free from hydroxy groups and primary amino groups. When B is a radical of a diazo component of the naphthalene series it is preferably sulphonaphthyl. When B is the radical of a diazo component of the benzene series it may be substituted by substituents common for diazo components of anionic dyes such as halogen, alkyl, alkoxy, carboxy, sulpho and nitro, and/or by a phenylamino group in the meta or para position, the benzene nucleus of which is optionally substituted by substituents such as sulpho, carboxy and nitro, or by a methylbenzothiazolyl radical the benzene nucleus of which is optionally substituted by sulpho.

Any alkyl and alkoxy groups in B preferably contain 1 to 4 carbon atoms and can be linear or branched; more preferably any alkyl and alkoxy groups contain 1 to 2 carbon atoms, with methyl and methoxy being most preferred.

Any halogen in B is preferably chlorine or bromine, preferably chlorine.

Preferably B is B₁, where B₁ is a radical of formula (b₁), (b₂) (b₃) or (b₄)

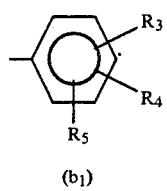 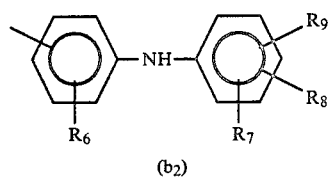

(b₁)    (b₂)

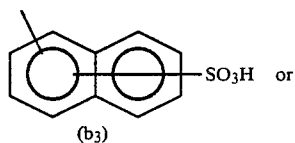

(b₃)

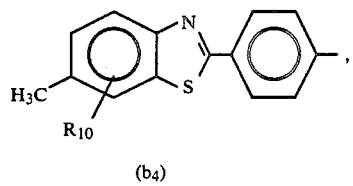

(b₄)

in which
R₃ is hydrogen, halogen, $C_{1-4}$alkyl, $C_{1-4}$alkoxy or nitro,
R₄ is hydrogen, halogen, $C_{1-4}$alkyl, $C_{1-4}$alkoxy, sulpho or carboxy (the latter in a position other than ortho to the azo group),
R₅ is hydrogen, halogen, $C_{1-4}$alkyl or carboxy (in a position other than ortho to the azo group),
R₆ is hydrogen, $C_{1-4}$alkyl, $C_{1-4}$alkoxy, chlorine or sulpho,
R₇ is hydrogen, sulpho or carboxy,
R₈ is hydrogen or nitro,
R₉ is hydrogen or nitro, and
R₁₀ is hydrogen or sulpho,
with the proviso that in (b₂) the free-bond is para or meta to the —NH— group and (b₂) contains at most one sulpho group.

In (b₁) R₃ is preferably R₃', where R₃' is hydrogen, chlorine, $C_{1-4}$alkyl, $C_{1-4}$alkoxy or nitro; more preferably R₃ is R₃'', where R₃'' is hydrogen, methyl, methoxy or nitro; most preferably R₃ is R₃''', where R₃''' is hydrogen, nitro or methyl, with hydrogen and methyl being especially preferred.

R₄ is preferably R₄', where R₄' is hydrogen, chlorine, bromine, carboxy or sulpho; more preferably R₄ is R₄'', where R₄'' is hydrogen or sulpho, especially sulpho.

R₅ is preferably R₅', where R₅' is hydrogen, $C_{1-4}$alkyl or carboxy; more preferably R₅ is R₅'', where R₅'' is hydrogen or methyl, with methyl being especially preferred.

Preferably in (b₁) at least one position ortho to the azo group is other than hydrogen or nitro, and is preferably halogen, $C_{1-4}$alkyl or sulpho, more preferably chlorine, methyl or sulpho. Preferred (b₁) radicals are those wherein a chlorine atom, or preferably a methyl group, is in ortho position to the azo group.

Preferably (b₁) is (b₁'), where (b₁') is a radical of formula (b₁) with R₃ having the significance of R₃', R₄ that of R₄' and R₅ that of R₅'. More preferably (b₁) is (b₁'') where (b₁'') is a radical of formula (b₁) where R₃ has the significance of R₃'', R₄ that of R₄' and R₅ that of R₅''. Most preferably (b₁) is (b₁''')

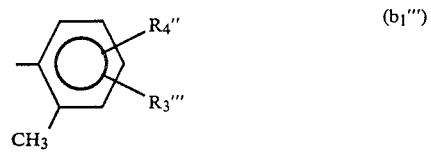

(b₁''')

R₆ is preferably hydrogen, methyl or sulpho; more preferably R₆ is R₆', where R₆' is hydrogen or methyl. Preferably such methyl as R₆ is para to the —NH— group. Most preferably R₆ is hydrogen.
R₇ is preferably sulpho.
R₈ is preferably nitro.
R₉ is preferably hydrogen.

The nitro and sulpho groups as R₇ and R₈ are preferably meta to each other and one is in the para position with respect to the —NH— group. In formula (b₂) the group —NH— is preferably para to the azo group.

Preferably (b₂) is (b₂')

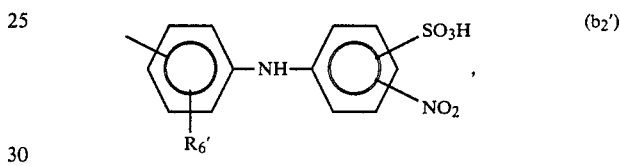

(b₂')

in which the sulpho and nitro groups are meta to each other and one of these groups is in the para position.

More preferably (b₂) is (b₂''), where (b₂'') is (b₂') wherein R₆' is hydrogen and the free bond is para to the —NH— group.

In (b₃) the sulpho group may be in any position. Preferably (b₃) is 3-, 4-, 5-, 6- or 7-sulphonaphthyl-1 or 5-, 6-, or 8-sulphonaphthyl-2, most preferably 4- or 6-sulphonaphthyl-1.

Preferably B is B₁', where B₁' is a radical of formula (b₁) or (b₂), especially (b₁).

Preferred compounds of formula I are those of formula Ia,

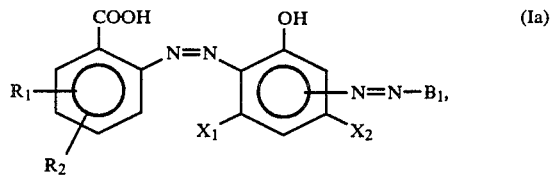

(Ia)

in which one of X₁ and X₂ is hydrogen and the other is hydroxy, and
the compound contains at most two sulpho groups. More preferred compounds of formula Ia are those where X₁ is hydrogen and X₂ is hydroxy, especially those which contain at most one sulpho group. Preferably the compounds of formula Ia contain a single sulpho group. More preferred compounds of formula Ia are those in which B₁ is B₁'.

Even more preferred compounds of formula Ia are those of formula I_b

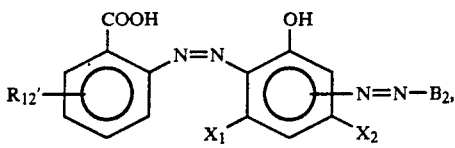

in which $B_2$ is $(b_1'')$ or $(b_2')$, especially those which contain one sulpho group and preferably $X_1$ is hydrogen and $X_2$ is hydroxy.

Most preferred compounds of formula Ia are those of formula Ic

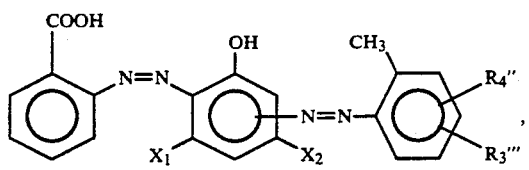

especially those in which $X_1$ is hydrogen and $X_2$ is hydroxy and which contain one sulpho group.

The complexes of the present invention are preferably 1:2 chromium complexes and can be complexes of a compound of formula I and a further metallizable disazo compound or complexes of two compounds of formula I in which case the compounds of formula I are the same or different.

As stated above, the complexes of the invention contain at least one water-solubilising group and have a water-solubility of at least 3 g/l at pH 7 at 20° C. Preferred water-solubilising groups are carboxy and sulpho, preferably sulpho. It will be appreciated that the carboxy group ortho to the azo group in the compounds of formula I does not count as a water-solubilising group. Preferably the complexes contain at most one sulpho group per complex-forming disazo compound and optionally one or two carboxy groups.

Preferred complexes are those
(i) where both complex-forming compounds are of formula Ia, in which each $X_1$, $X_2$, $R_1$, $R_2$ and $B_1$ is the same or different and the complexes contain one or two sulpho groups;
(ii) those of (i), where $R_1$ is $R_1'$ and $R_2$ is $R_2'$ and each of $R_1$ and $R_2$ are the same or different;
(iii) those of (i) or (ii), where each $B_1$, independently, is $B_1'$;
(iv) those of (iii) where each $B_1$, independently, is $(b_1)$;
(v) those where both complex-forming compounds are of formula Ib, in which each $R_{12}'$, $X_1$, $X_2$ and $B_2$ is the same or different and the complexes contain one or two sulpho groups, especially, when $X_1 = H$ and $X_2 = OH$;
(vi) those of (v) wherein each $B_2$, independently is $(b_1''')$;
(vii) those where both complex-forming compounds are of formula Ic and each $X_1$, $X_2$, $R_3'''$ and $R_4'''$ is the same or different and the complexes contain one or two sulpho groups;
(viii) those of (i) to (vii) where each complex-forming disazo compound is the same.

The complexes of the invention are in free acid or salt form. Preferably, the complexes are in salt form. Suitable cations for the salt form are those cations common in anionic metal complexes. Preferred cations are alkali metal and ammonium, for example sodium, lithium, potassium, ammonium, mono-, di- and tri-isopropylammonium, mono-, di- and tri-ethanolammonium etc., with lithium, sodium and potassium being most preferred. By "salt form" is meant that an acid group in the molecule and additionally in the case of the 1:2 chromium complexes the cation compensating the negative charge on the metal may be hydrogen or one of the cations of the salt form of any acid groups in the complex. Preferably an 1% aqueous solution of the complexes of the invention has a pH value of 5 to 9, more preferably 6 to 8.

The complexes of the invention may be prepared by metallising a compound of formula I or a mixture of compounds of formula I, or a compound of formula I and a further metallizable disazo compound, with a chromium-donating compound. Metallization is effected in accordance with known methods, for example in a medium having a pH value of from 3 to 6 and at temperatures of from 95° to 130° C., optionally under pressure.

Generally, owing to the reaction and isolation conditions the compounds are obtained in salt form; however, the free acid form or other salt forms may be obtained therefrom in accordance with known methods.

The compounds of formula I may be prepared in accordance with known methods. Advantageously the first coupling with 1,3-dihydroxybenzene is effected in an aqueous medium having a pH values of at least 8. The second coupling is suitably effected at pH values of from 8 to 10. The temperature of the coupling reactions is suitably from −2° to 30° C., preferably from 0° to 10° C.

After isolation, the complexes of the invention may be mixed with conventional blending agents such as sodium sulphate, sodium chloride or dextrin for dyeing.

The complexes of the invention are useful as anionic dyestuffs for dyeing and printing anionic dyeable textile and non-textile substrates. Suitable substrates include natural and synthetic polyamide, polyurethane and anodized aluminium. The most preferred substrates are leather and fur-lined leather. Depending on the substrate, dyeing is effected by exhaust dyeing, pad-dyeing or printing in accordance with known methods. Preferably for dyeing leather, 0.02 to 20, more preferably 0.1 to 10, parts dye per 100 parts dry leather, is employed and dyeing is effected at 20° to 80° C., more preferably 20° to 65° C. The leather dyeings obtained are brown and have good light fastness, fastness to diffusion in PVC and good wet-fastnesses.

The following Examples further serve to illustrate the invention. In the Examples all parts are by weight and temperatures are in degrees Centigrade.

EXAMPLE 1

13.7 Parts 2-amino-1-carboxy-benzene, suspended in 75 parts 10% hydrochloric acid, are diazotized at 0°–5° with the addition of 6.9 parts sodium nitrite (conc. aq. soln.). The diazo solution at 0°–5° is allowed to flow into 11 parts 1,3-dihydroxybenzene dissolved in 100 parts water, the pH being kept at 9 by the addition of 10% aqueous sodium hydroxide. After coupling is complete the suspension is neutralized by the addition of 30% hydrochloric acid and the monoazo dye is filtered off and then washed with 10% sodium chloride solution.

18.7 Parts 2-amino-1-methylbenzene-5-sulphonic acid suspended in 75 parts 10% hydrochloric acid are diazotized at 0° to 5° with the addition of 6.9 parts sodium nitrite. The diazo solution is added to 25.8 parts 2'-carboxy-2,4-dihydroxyazobenzene (prepared above) suspended in 500 parts water, the pH being kept at 9 by the addition of 10% aqueous sodium hydroxide. After completion of coupling the disazo dye suspension is reacted with 13 parts chrom-III-acetate and stirred at 100° at a pH between 4 and 5. After chromation, the dye is separated by the addition of sodium chloride, filtered and dried in vacuo at 100°. The product is in the sodium salt form and corresponds in the free acid form to formula

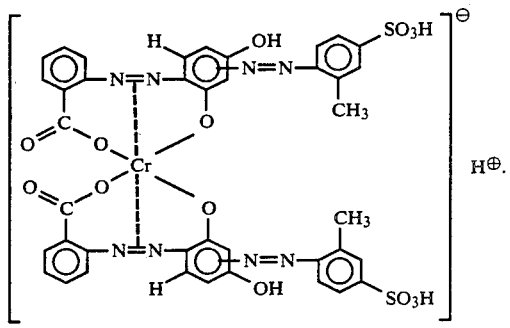

The product dyes leather in even middle-brown shades and gives dyeings which have good light and diffusion fastness.

As set forth above, the complex of said formula is obtained in sodium salt form. However, other salts, especially alkali metal salts, may be obtained.

EXAMPLE 1a 13.7 Parts 2-amino-1-carboxybenzene suspended in 100 parts water are mixed with 25 parts 30% hydrochloric acid and are diazotized at 0° by the addition of 34.5 parts 20% sodium nitrite solution and ice. The diazo solution is allowed to flow into 11 parts 1,3-dihydroxybenzene dissolved in 200 parts water at pH 12° and 0°, whereby the pH value and temperature are maintained by the addition of 10% aqueous sodium hydroxide and ice. After coupling, 500 parts water are added and the monoazo dye is precipitated at pH 2 by the addition of hydrochloric acid and then separated by filtration. The filter cake is stirred in 500 parts water and adjusted to pH 9 with aqueous sodium hydroxide.

18.7 Parts 2-amino-1-methylbenzene-5-sulphonic acid are stirred in 200 parts water, mixed with 25 parts 30% hydrochloric acid and diazotized at 0° C. by the addition of 34.5 parts 20% aqueous sodium nitrite solution and ice. The diazo suspension is allowed to flow at pH 9° and 10° into the suspended monoazo dye, the pH value and temperature being maintained by the addition of 20% aqueous sodium hydroxide and ice. After coupling, the disazo dye is salted out by adding sodium chloride and separated by filtration. The filter cake is dissolved in 1000 parts water at 50° and mixed with 13 parts chrom-III-acetate and metallized at pH 4.5 at a temperature of 100°. After chromation the dye is precipitated with sodium chloride, filtered and dried at 100° in vacuo. The dyestuff is identical with that of Example 1.

EXAMPLE 2

25.8 Parts of the monoazo dye prepared as described in Example 1 or 1a are suspended in 500 parts water. A diazo suspension of diazotized 4'-amino-4-nitro diphenylamine-2-sulphonic acid prepared in conventional manner is allowed to flow into the monoazo dye suspension, the pH being maintained at 9 by adding 30% aqueous sodium hydroxide. After coupling is complete the disazo dye suspension is mixed with 13 parts chrom-III-acetate and stirred at pH 4 to 5 under pressure at a temperature of 125°. After chromation the dye is precipitated by adding sodium chloride, filtered and dried in vacuo at 100°. The product which is obtained in the sodium salt form corresponds, in the free acid form, to formula

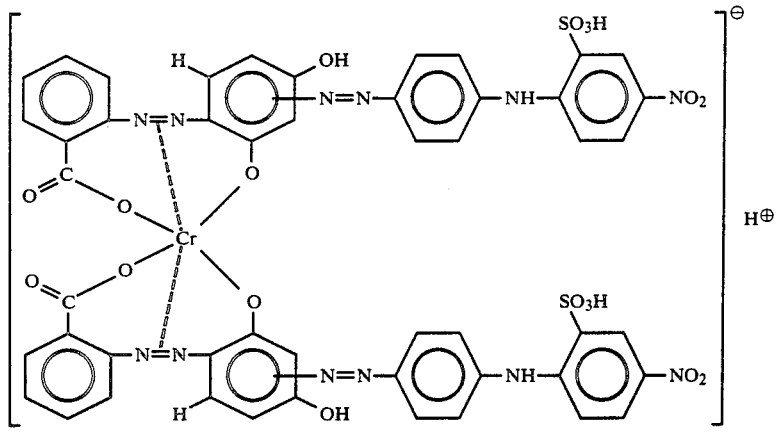

and builds-up well on leather giving level brown dyeings having notable light and diffusion fastness.

Further 1:2 complexes according to the invention prepared in accordance with Examples 1, 1a and 2 are given in the following Table; they are identified by the diazo components HOOC—A—NH$_2$ and B—NH$_2$ and the shade of dyeing on leather.

TABLE

| No. | HOOC—A—NH$_2$ | B—NH$_2$ | Shade on leather |
|---|---|---|---|
| 3 | 2-amino-1-carboxybenzene | 4-amino-1-methylbenzene-3-sulphonic acid | middle brown |
| 4 | " | 2-amino-1,4-dimethylbenzene-5-sulphonic acid | " |
| 5 | " | 1-aminobenzene-2-sulphonic acid | " |
| 6 | " | 1-aminobenzene-3-sulphonic acid | " |
| 7 | " | 1-aminobenzene-4-sulphonic acid | " |

TABLE-continued

| No. | HOOC—A—NH$_2$ | B—NH$_2$ | Shade on leather |
|---|---|---|---|
| 8 | " | 1-aminonaphthalene-4-sulphonic acid | brown |
| 9 | " | 1-aminonaphthalene-5-sulphonic acid | middle brown |
| 10 | " | 1-aminonaphthalene-6-sulphonic acid | " |
| 11 | " | 1-aminonaphthalene-7-sulphonic acid | " |
| 12 | " | 2-aminonaphthalene-6-sulphonic acid | " |
| 13 | " | 4'-amino-2-nitrodiphenylamine-4-sulphonic acid | brown |
| 14 | " | 4-aminodiphenylamine-2-sulphonic acid | " |
| 15 | " | 3-amino-4-methyl-2'-nitrodiphenylamine-4'-sulphonic acid | middle brown |
| 16 | 2-amino-1-carboxybenzene-5-sulphonic acid | 2-amino-1-methylbenzene | " |
| 17 | 2-amino-1-carboxybenzene-5-sulphonic acid | 2-amino-1-ethylbenzene | " |
| 18 | 2-amino-1-carboxybenzene-5-sulphonic acid | 1-amino-2-chlorobenzene | middle brown |
| 19 | 2-amino-1-carboxybenzene-5-sulphonic acid | 1-amino-2-methoxybenzene | reddish-brown |
| 20 | 2-amino-1-carboxybenzene-5-sulphonic acid | 2-amino-4-chloro-1-methylbenzene | middle brown |
| 21 | 2-amino-1-carboxybenzene-5-sulphonic acid | 2-amino-1-methyl-4-nitrobenzene | " |
| 22 | 2-amino-1-carboxybenzene-5-sulphonic acid | 2-amino-1-methyl-5-nitrobenzene | " |
| 23 | 2-amino-1-carboxybenzene-5-sulphonic acid | 1-amino-2-chloro-4-nitrobenzene | middle brown |
| 24 | 2-amino-1-carboxybenzene-5-sulphonic acid | 1-amino-2-bromo-4-nitrobenzene | " |
| 25 | 2-amino-1-carboxybenzene-5-sulphonic acid | 1-amino-2,6-dichloro-4-nitrobenzene | reddish-brown |
| 26 | 2-amino-1-carboxybenzene-5-sulphonic acid | 4-amino-1-carboxybenzene | middle brown |
| 27 | 2-amino-1-carboxybenzene-5-sulphonic acid | 1-amino-4-nitrobenzene | " |
| 28 | 2-amino-1-carboxybenzene-4-sulphonic acid | 2-amino-1-methylbenzene | " |
| 29 | 2-amino-1,4-dicarboxybenzene | 2-amino-1-methylbenzene-5-sulphonic acid | " |
| 30 | " | 4'-amino-2-nitrodiphenylamine-4-sulphonic acid | brown |
| 31 | " | 4'-amino-4-nitrodiphenylamine-2-sulphonic acid | " |
| 32 | " | 3-amino-4-methyl-2'-nitrodiphenylamine-4'-sulphonic acid | middle brown |

APPLICATION EXAMPLE A

100 Parts conventionally chrome tanned, wet-shaved and neutralized grain leather and 250 parts water at 55° are put into a bath and with milling 0.5 parts of the dye prepared as described in Example 1 or 1a dissolved in 20 parts water are added; milling is effected for 30 minutes at 55° C. Then 4 parts of a fat liquor based on sperm oil is added and milling is continued for 30 minutes. Subsequently, 5 parts 8% formic acid are added slowly and milling is effected for 10 minutes. The leather which is dried and finished in the usual manner is dyed in a level middle-brown shade having good light fastness.

APPLICATION EXAMPLE B

100 Parts intermediate dried chrome-tanned suede-split leather are milled with 400 parts water, 2 parts 25% aqueous ammonia and 0.2 parts conventional wetting agent are milled in a bath for 1 hour at 50°. In a fresh bath the wet leather is dyed in a bath containing 400 parts water at 60°, 1 part 25% aqueous ammonia and 5 parts of the dyestuff, prepared as described in Example 1 or 1a, dissolved in 200 parts water for 90 minutes at 60°. 50 Parts 8% formic acid are slowly added and treatment is continued for a further 30 minutes. After rinsing and finishing in the usual manner a level middle brown dyeing having good light fastness is obtained.

In analogy with the above procedures the dyes of Examples 2 to 32 may be employed for dyeing leather.

What is claimed is:

1. A 1:2 chromium complex of the formula

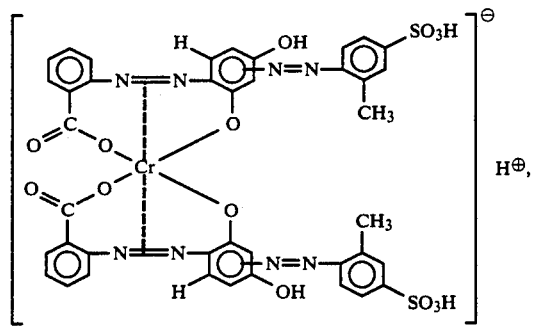

or a salt thereof.

2. A salt of a 1:2 chromium complex according to claim 1 having the formula

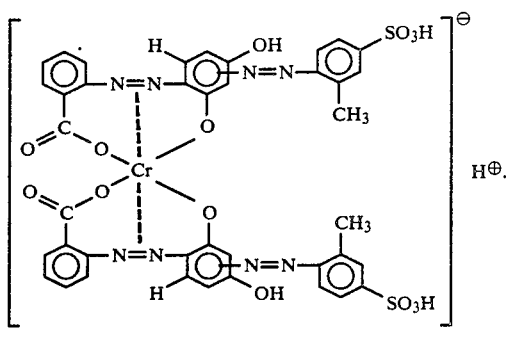
3. A lithium, sodium or potassium salt of a 1:2 chromium complex according to claim 2.
4. A sodium salt of a 1:2 chromium complex according to claim 3.
5. A 1:2 chromium complex of the formula
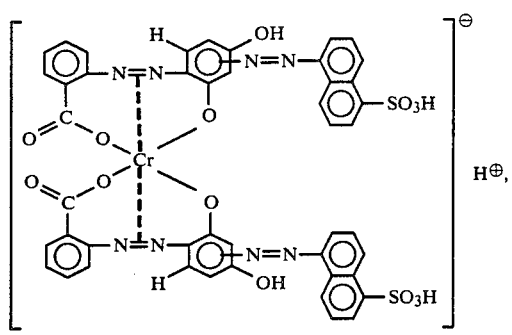
or a salt thereof.
6. A sodium salt of a 1:2 chromium complex according to claim 5.
* * * * *